O. E. SHULER & H. L. TEX.
CAR RACK.
APPLICATION FILED JULY 24, 1918.
1,295,806.
Patented Feb. 25, 1919.
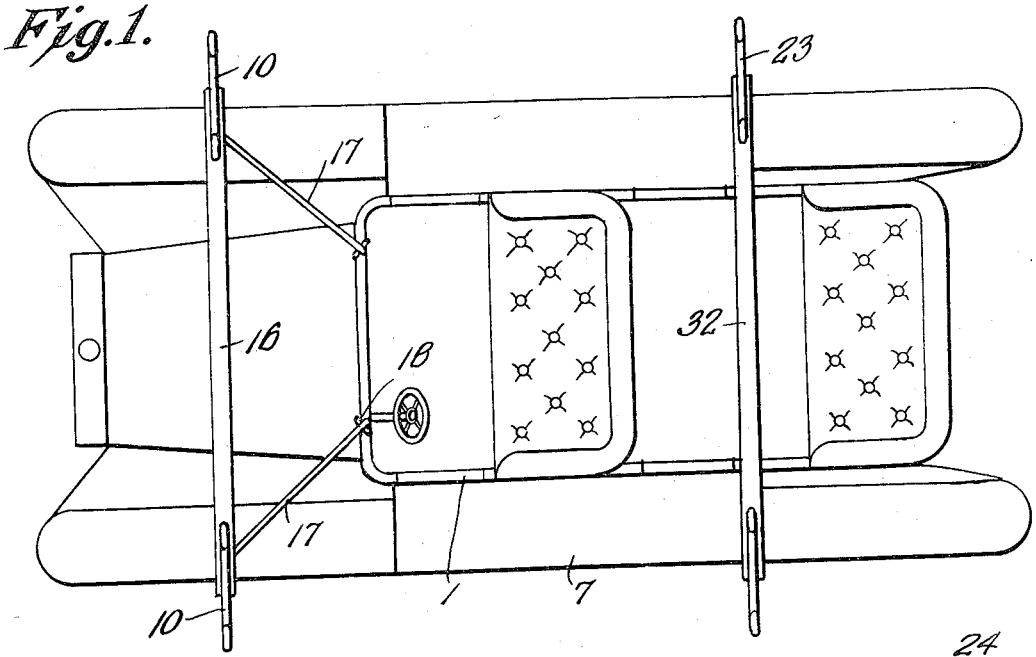
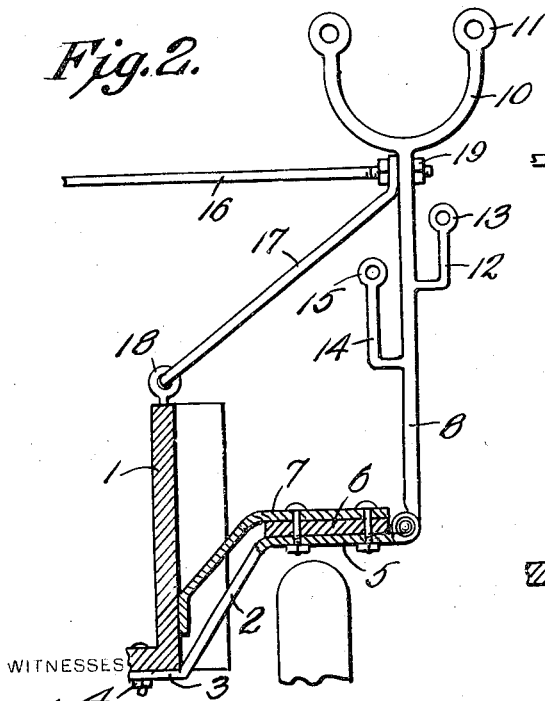
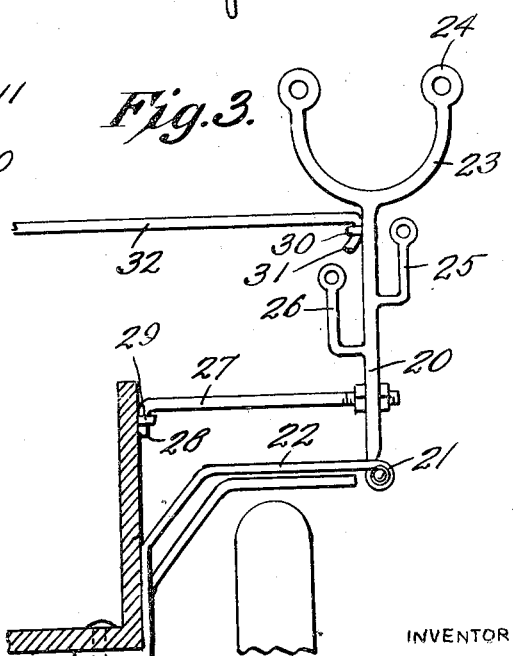
INVENTOR
Oliver Edward Shuler and
Henry Leo Tex,
ATTORNEY

UNITED STATES PATENT OFFICE.

OLIVER EDWARD SHULER AND HENRY LEO TEX, OF ELMA, IOWA.

CAR-RACK.

1,295,806.           Specification of Letters Patent.     Patented Feb. 25, 1919.

Application filed July 24, 1918. Serial No. 246,566.

*To all whom it may concern:*

Be it known that we, OLIVER EDWARD SHULER and HENRY LEO TEX, citizens of the United States, residing at Elma, in the county of Howard and State of Iowa, have invented certain new and useful Improvements in Car-Racks, of which the following is a specification.

This invention relates to a rack which is adapted to be secured to the frame or body of an automobile, whether the frame or body is of touring car type or of a delivery truck type.

Another object of this invention is the production of a simple and efficient bracket which is adapted to be secured to the body of an automobile for the purpose of conveniently supporting suitable articles such as spouting pipe and ladders, etc.

With these and other objects in view this invention consists of certain novel constructions, combinations and arrangements of parts as will be hereinafter described and claimed.

In the drawings:—

Figure 1 is a top plan view of an automobile body showing the racks mounted thereon, Fig. 2 is a section taken through the forward portion of an automobile body, showing one end of the front rack, Fig. 3 is a section taken through the rear portion of an automobile body, showing one end of the rear rack.

By referring to the drawings, it will be seen that 1 designates the body of the automobile which carries a plurality of supporting brackets 2 near the front end thereof, which brackets are provided with inwardly extending feet 3 through which feet extend the securing bolt 4 for firmly holding the feet 3 in engagement with the body 1. Each bracket 2 is provided with a laterally extending upper end 5 which upper end 5 carries a bumper block 6 for the purpose of preventing the upper end 5 of the bracket 2 from injuring the fender or mud guard 7.

Each bracket 5 carries a vertically extending article supporting arm 8, the arms 8 being secured to the bracket 2 by means of suitable pins. The upper end of each arm 8 is provided with a spout receiving rack 10 which comprises a pair of outwardly diverging arms carrying eyes 11 at the upper ends thereof. A suitable strap of any desired construction may extend through these eyes 11 for the purpose of holding spouting or other articles within the rack 10.

Each arm 8 is provided with a ladder supporting bracket which is spaced from the arm 8 and is provided with an upwardly extending finger 12 carrying an eye 13 for the purpose of permitting a securing strap or the like to be inserted therethrough and passed around a ladder for holding the same against accidental disengagement with the rack 12. A pipe supporting rack 14 is secured to the inner face of each arm 8 and is provided with an eye 15 at its upper end for permitting a securing band or strap to pass around pipe and the like supported by a pipe rack 14. It should be understood that two of these arms 8 are supported near the front end of the automobile body preferably in line with the axle of the front wheels and the rear arms are placed in a position adjacent or near the rear door frame. It of course should be understood that these arms 8 may be located in any convenient or desired position upon the body of the automobile without departing from the spirit of the invention.

The two front arms 8 are connected by means of a transversely extending bar 16 and these front arms 8 are braced by means of the rearwardly extending brace arms 17 which are connected to the dash board of the automobile or motor vehicle by means of eyes 18. As shown in Fig. 2 the transversely extending bar 16 carries a plurality of nuts 19, which nuts 19 firmly clamp the arms 8 and 17 and constitute an efficient securing means for locking the bar 16 in engagement with the arms 17 and 8.

As shown in Fig. 3 the rear rack comprises a pair of vertically extending arms 20, these arms being secured to the outer rolled ends 21 of the bracket arms 22. The arms 20 of a rear rack are provided with spout receiving racks 23 at their upper ends having eyes 24 carried upon the spaced arms of the rack 23. The rear rack arms 20 are provided with vertically extending outer fingers 25 and vertically extending inner fingers 26 for the purpose of receiving the respective ladders and pipes as set forth in connection with Fig. 2. These arms 20 are braced near their lower ends by means of the inwardly extending bracing bars 27, which bars 27 are provided with hooked ends 28 fitting within the eyes 29 carried by the body of the vehicle adjacent the rear door frames thereof. The arms 20 of the rear rack carry suitable eyes 30 within which eyes 30 fit the hooks 31 of the transversely extending bracing bar 32. By considering Fig. 3 it will be seen that a very simple and efficient means has been produced for the purpose of efficiently bracing the vertically extending arms 20 and holding the same in a proper position for conveniently supporting the material which is carried by the automobile.

From the foregoing description it will be seen that a very simple and efficient rack has been produced for attaching the same to a body of a motor vehicle, without injury to the body of the vehicle. By means of a particular rack described and illustrated, certain unhandy and cumbersome articles such as spouting, pipes and ladders may be supported and conveniently carried by the body of the automobile without injury to the body thereof.

It of course should be understood that certain detail obvious mechanical changes may be made in the present invention without departing from the spirit thereof, so long as these changes fall within the scope of the appended claims.

What is claimed is:—

1. A rack of the class described comprising a pair of forward arms and a pair of rearward arms, a transversely extending bar connecting said forward arms together, article supporting means carried by said arms, releasable brace engaging said rearward arms, and means for connecting the lower ends of said arms to the body of a vehicle.

2. A rack for a motor vehicle comprising a plurality of article supporting arms, each arm provided with a spouting supporting rack at the upper end thereof, a ladder supporting arm carried by the outer side of each first mentioned arm, a pipe supporting bracket secured to the inner face of each arm, means for supporting said arms upon a vehicle, and said spout supporting rack, said ladder supporting arm and said pipe supporting bracket provided with eyes formed therein for receiving a securing means whereby an article may be held in engagement therewith.

3. A rack of the class described comprising a plurality of article supporting arms, bracing means for the upper ends of said arms, and rearwardly inclined bracing members secured to said arms and releasably held in engagement with the wind shield of a vehicle.

4. A rack of the class described comprising a plurality of supporting arms, a transverse brace connecting said supporting arms at their upper ends, a bracket carried by the lower end of each arm and provided with means for securing said bracket to the body of a vehicle, said bracket provided with a laterally extending upper end, a block carried by said laterally extending upper end and adapted to extend under the mud guard of a vehicle for shielding said mud guard from injury by said bracket, and a transversely extending brace secured to the lower end of said arms and releasably secured in engagement with the body of a vehicle.

5. A rack of the class described comprising a forward rack, a rearward rack, each rack comprising a pair of vertically extending arms, means connected between said arms for bracing the same against lateral swinging movement, rearwardly inclined bracing arms secured to said vertical arms and secured to the front of a support for preventing the forward swinging movement thereof, the vertically extending arms of said rearward rack provided with inwardly projecting bracing fingers, and means carried by the body of an automobile and adapted to be engaged by said bracing fingers for holding said arms of said rearward rack against laterally swinging movement.

In testimony whereof we affix our signatures in presence of two witnesses.

OLIVER EDWARD SHULER.
HENRY LEO TEX.

Witnesses:
 REED ELWOOD,
 F. D. ELWOOD.